I. S. EASTMAN.
Rotary-Fans.
No. 134,740. Patented Jan. 14, 1873.
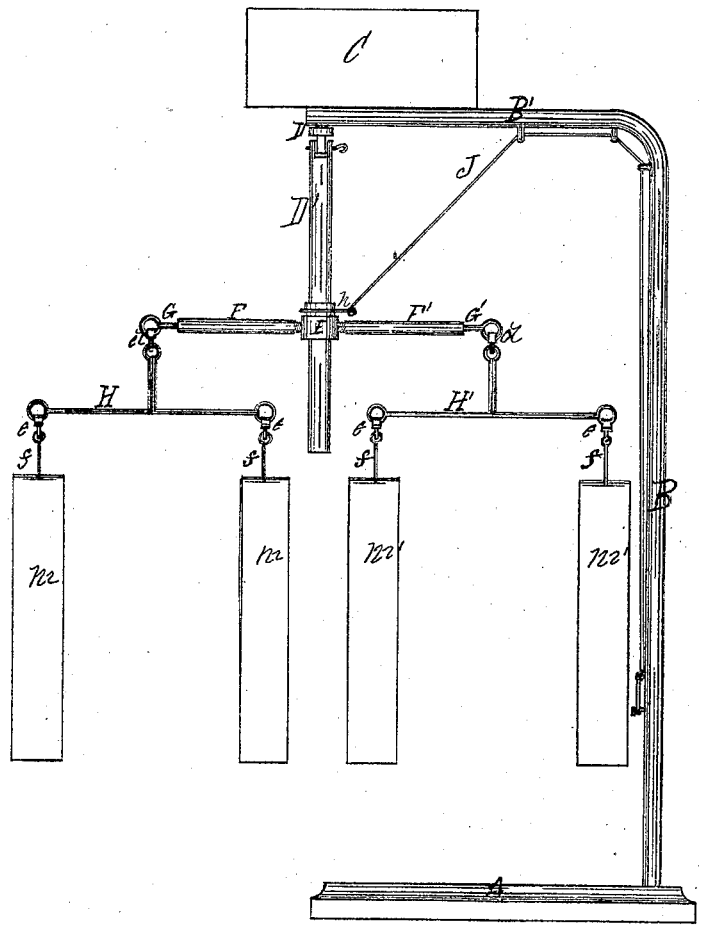

UNITED STATES PATENT OFFICE.

IRAD S. EASTMAN, OF MADISON, WISCONSIN.

IMPROVEMENT IN ROTARY FANS.

Specification forming part of Letters Patent No. 134,740, dated January 14, 1873.

*To all whom it may concern:*

Be it known that I, IRAD S. EASTMAN, of Madison, in the county of Dane and State of Wisconsin, have invented certain new and useful Improvements in Rotating Fans; and I do hereby declare the following to be a full, clear, and exact description thereof, which will enable others skilled in the art to which my invention appertains to make and use the same, reference being had to the accompanying drawing forming part of this specification, in which the figure of the drawing is a side elevation of a rotating fan embodying my said improvements, the several parts thereof being designated by different letters marked thereon.

My invention relates to that class of rotating fans which are operated by a system of geared wheels, and has for its object to provide a device for driving mosquitoes or flies from a bed or table; and the improvement consists in a novel arrangement of parts, so constructed as to be capable of lateral and vertical adjustment jointly with the rotating motion thereof, whereby the fans are made to describe any given circle, and are raised or lowered to any required height, all of which will be more fully understood by the following description:

In the drawing, A represents the base or bed of the machine, and B a vertical shaft or standard, the upper end of which is bent to a horizontal position, as shown at B'. C is a metal case, which is firmly secured to the horizontal part B' of the standard. Within this case is arranged a system of geared wheels, which impart a rotating motion to shaft D; but, as the same constitutes no part of the present invention, a description thereof is not necessary to be herein fully given. Suspended from and hinged to the lower extremity of shaft D is a shaft, D', which is so arranged as to rotate therewith. Loosely fitted upon shaft D' is a sleeve, E, which is so arranged as to admit of being moved to any desired height thereon, and firmly secured by arms F F', the ends of which are screw-threaded, and pass into the said sleeve to and in contact with the shaft. These arms are made hollow, and within them are loosely fitted supplemental arms G and G', which are so arranged as to admit of being moved therein to or from the shaft. The outer ends of the said supplemental arms are each bent, forming a loop or eye, within which is loosely secured a swivel, d. To the end of said swivels are attached horizontal arms H and H', as shown in the drawing. The ends of these arms are each also bent, forming a loop or eye, within which is loosely fitted swivels e and e'. To each of these swivels is secured a cord, f, to which the fans m and m' are attached. The fans are composed of two or more strips of tissue paper or other similar material, united at the top. The upper extremity of sleeve E is provided externally with a groove or channel, within which is loosely fitted a stirrup, h, to which is attached a cord, J, the said cord extending upward to the lower surface of the horizontal portion B' of the standard, and is passed through a system of staples firmly secured thereto, thence downward to a point near the lower extremity of the standard, and is there attached to a hook or staple, which is so arranged as to admit of easily attaching or detaching the same. The object of this cord is to raise shaft D' to a horizontal position when not in use, and thereby stop the movement of the gearing and raise the fans up out of the way.

I do not wish to confine myself strictly to attaching the case containing the gearing to the standard, as the same may be suspended from the ceiling above by any convenient means.

In using my invention the same may be suspended over a bed to protect a person from mosquitoes, or may be placed upon or over a table to keep the flies therefrom, and is operated as follows: The sleeve E being properly adjusted to bring the fans to the proper height and the supplemental arms arranged at the proper position to describe the required circle, shaft D' is then rotated by means of the gearing, which imparts a rotating motion to the fans jointly with the shaft; and as the same is rotated an independent rotating motion is imparted to the separate system of fans, thereby producing a compound and uniform motion of the same.

Having thus described my invention, I claim—

1. The combination of shaft D', sleeve E, arms F F', constructed as described, with the supplemental arms G G' and horizontal arms H H' carrying the fans, all arranged to operate substantially as and for the purpose described.

2. In combination with the subject-matter of the above claim, the cord J for adjusting the shaft D', substantially as and for the purpose described.

IRAD S. EASTMAN.

Witnesses:
 WILLIAM EDGAR,
 J. W. MERRIAM.